United States Patent [19]

Katayama et al.

[11] Patent Number: 4,949,264

[45] Date of Patent: Aug. 14, 1990

[54] TRANSMISSION HAVING ELECTROMAGNETIC PROPORTIONAL REDUCTION VALVE

[75] Inventors: Yoshiyuki Katayama; Takeshi Ura, both of Sakai, Japan

[73] Assignee: Kubota, Ltd., Osaka, Japan

[21] Appl. No.: 247,568

[22] Filed: Sep. 22, 1988

[51] Int. Cl.$^5$ .................. B06K 41/28; F16D 43/28
[52] U.S. Cl. .................. 364/424.1; 192/109 F; 74/867
[58] Field of Search .......... 364/424.1; 192/109 F, 192/85 AA; 74/862, 867

[56] References Cited

U.S. PATENT DOCUMENTS

| | | | |
|---|---|---|---|
| 4,465,168 | 8/1984 | Sato | 192/109 F |
| 4,711,329 | 12/1987 | Hasegawa et al. | 192/109 F |
| 4,718,525 | 1/1988 | Yamaguchi | 192/109 F |
| 4,800,497 | 1/1989 | Koori et al. | 364/424.1 |

FOREIGN PATENT DOCUMENTS 59-110923  6/1984  Japan .
61-13604   6/1986  Japan .

*Primary Examiner*—Parshotam S. Lall
*Assistant Examiner*—Christopher L. Makay
*Attorney, Agent, or Firm*—Edwin E. Greigg

[57] ABSTRACT

A hydraulic control apparatus for a transmission comprising a hydraulic change speed clutch, an oil line connecting the change speed clutch to an oil pump, an electromagnetic proportional reduction valve mounted on the oil line for varying oil pressure output to the change speed clutch in response to control current applied to the reduction valve, a microcomputer for producing the control current and applying the same to the reduction valve, and a command unit for transmitting a command to the microcomputer to engage the change speed clutch. The control current produced by the microcomputer includes a first component current continuing at a first current level for a first predetermined period, a second component current following the first component current and continuing at a second current level lower than the first current level for a second predetermined period, and a third component current following the second component current, starting at a third current level not exceeding the second current level and continuing at a current level which rises with progress of time.

5 Claims, 4 Drawing Sheets

TRANSMISSION HAVING ELECTROMAGNETIC PROPORTIONAL REDUCTION VALVE

BACKGROUND OF THE INVENTION (1) Field of the Invention

The present invention relates to a hydraulically operated transmission having an electromagnetic proportional reduction valve mounted on a pressure oil supply line leading to a hydraulic change speed clutch, clutching pressure of the hydraulic clutch being controllable by controlling electric current applied to the reduction valve.

(2) Description of the Prior Art

Among known hydraulically operated transmissions is the type which, when operating the clutch, applies a control current or voltage that increases from a predetermined level with progress of time, to the electromagnetic proportional reduction valve in order to reduce shocks accompanying the clutch operation.

In this type of transmission, however, the control current or voltage increases monotonically. Because of this and a great build-up resistance of the electromagnetic proportional reduction valve, there is a delay in the internal pressure increase of the hydraulic clutch and hence a long time taken for clutching action.

In order to eliminate the above disadvantage and to shorten the time required for the clutch operation, attempts have been made to improve the control current to be applied to the electromagnetic proportional reduction valve as disclosed in Japanese Patent Publication Kokai No. 61-136044, for example. None of such attempts made heretofore are satisfactory from the point of view of optimal clutch control to be achieved where a considerable pressure loss occurs between the reduction valve and the hydraulic clutch and where a great load or a small load acts on the transmission.

SUMMARY OF THE INVENTION

An object of the present invention is to provide an improvement on the prior art, i.e. to provide a hydraulic control apparatus for a transmission which assures smooth pressure increase characteristics even where there is a strong build-up resistance of the electromagnetic proportional reduction valve and where there is a considerable pressure loss between the reduction valve and the hydraulic clutch, and which enables smooth clutching regardless of variations in the load acting on the transmission.

In order to achieve the above object, a hydraulic control apparatus for a transmission according to the present invention comprises a hydraulic change speed clutch, a hydraulic pressure source, an oil line for connecting the change speed clutch to the hydraulic pressure source, an electromagentic proportional reduction valve mounted on the oil line for varying oil pressure output to the change speed clutch in response to control current applied to the reduction valve, control means for producing the control current and applying the same to the reduction valve, and command means for transmitting a command to the control means to engage the change speed clutch, wherein the control means produces the control current including a first component current continuing at a first current level for a first predetermined period, a second component current following the first component current and continuing at a second current level lower than the first current level for a second predetermined period, and a third component current following the second component current, starting at a third current not exceeding the second current level and continuing at a current level which rises with progress of time.

According to this construction, the first component current opens the reduction valve to a great extend thereby moving pistons of the hydraulic clutch at high speed. Following the first component current, the second component current throttles the reduction valve thereby checking a rapid increase of the pressure acting on the pistons of the hydraulic valve even when the pistons reach and stop at a predetermined position. Further, the third component current which gradually rises in level allows the reduction valve to gradually increase the pressure acting on the pistons.

Thus, the pistons are operated at high speed by supplying oil under high pressure until a half-clutch state is almost reached. After the half-clutch state, the oil pressure is reduced once to check inertial piston movement. Thereafter the clutch is allowed to change gradually to a driving state.

The third component current may start at a third current level lower than the second current level and that third current level rises with progress of time. Then the invention provides the further advantage of allowing the vehicle to start smoothly when only a small load acts on the transmission, for example.

In a preferred embodiment of the invention, the hydraulic control apparatus further comprises load detecting means for detecting loads acting on the transmission and transmitting load values to the control means. In this case, the control means comprises a microcomputer including a memory table for storing the first, second and third current levels, the first and second predetermined periods and a level rising rate of the third component current as related to the load values, for selection in accordance with the load values transmitted from the load detecting means. This construction realizes optimal clutching control based on the load acting on the transmission.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

An embodiment of the present invention will be described hereinafter with reference to the drawings.

Figure 1:
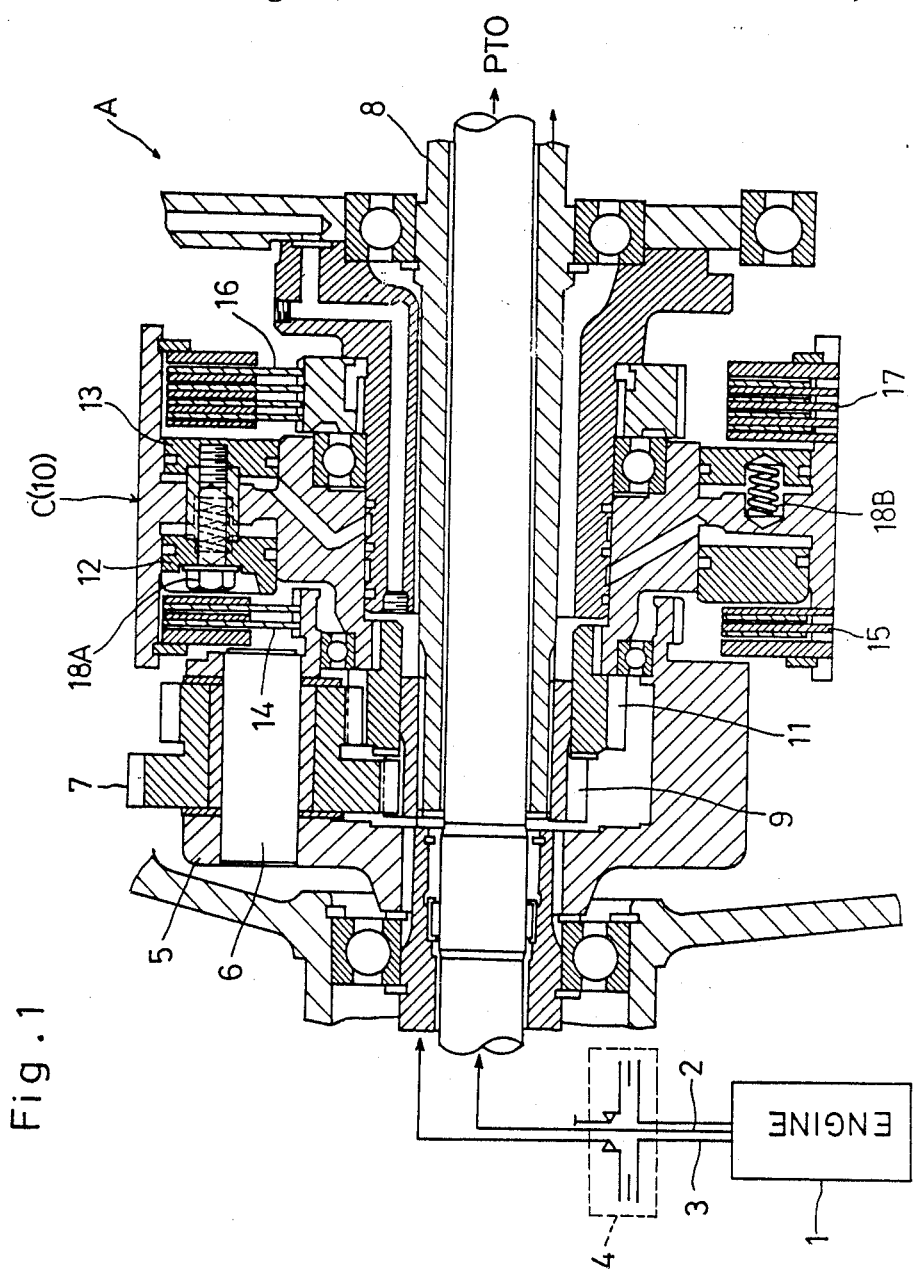
FIG. 1 is a sectional view of a backward and forward drive switching mechanism operable by a hydraulic clutch acting as part of a control device according to the present invention.

Referring to FIG. 1, the drive transmission system of an agricultural tractor comprises two lines, one for taking out drive of an engine 1 through a shaft 2 and the other for taking out the drive through a sleeve shaft 3 mounted on the shaft 2. The drive taken out through the shaft 2 is transmitted to a working implement (not shown), while the drive taken out through the sleeve shaft 3 is transmitted by way of a main clutch 4 and a hydraulically operated backward and forward drive switching mechanism A to a propelling device.

As shown, the backward and forward drive switching mechanism A includes planet gears 7 supported through support shafts 6 by a carrier 5 driven by the sleeve shaft 3, a first sun gear 9 splined to an output shaft 8 driven by the drive switching mechanism A, and a second sun gear 11 connected to a casing 10 housing a clutch C for operating the drive switching mechanism A. The clutch C includes a forward drive piston 12, a backward drive piston 13, the two pistons being housed in the casing 10 and movable in unison, disks 14 connected to the support shafts 6, disks 15 connected to the casing 10, the disks 14 and 15 being pressed into contact with one another by movement of the forward drive piston 12, disks 16 connected to a stationary member and disks 17 connected to the casing 10, the disks 16 and 17 being pressed into contact with one another by movement of the backward drive piston 12.

Reference numeral 18A indicates bolts interconnecting the forward drive piston 12 and backward drive piston 13. Reference numeral 18B indicates springs for neutralizing the pistons 12 and 13. These springs 13B act to hold the pistons 12 and 13 in neutral in the absence of oil pressure.

Figure 2:
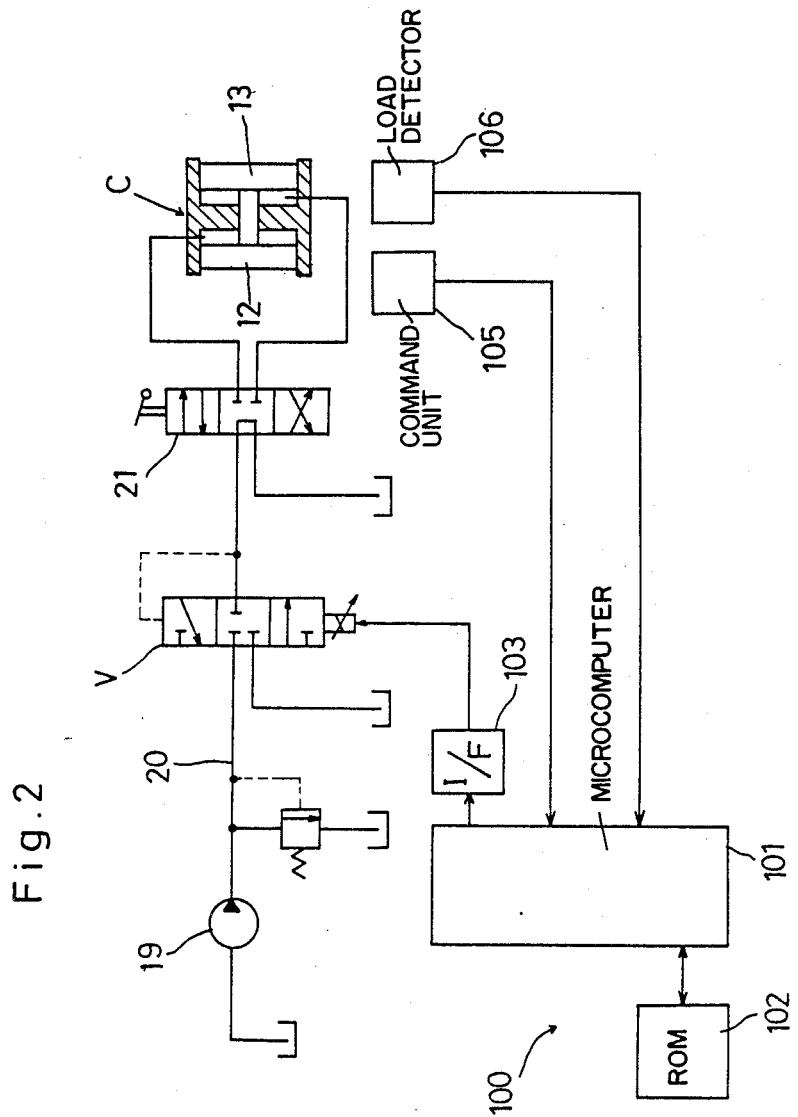
FIG. 2 is a hydraulic circuit diagram illustrating the construction of the control device.

Referring to FIG. 2, the clutch C receives pressure oil through an electromagnetic proportional reduction valve V which controls the oil pressure in response to a signal from an electric current control device 100. This construction is provided to minimize shocks accompanying operations of the clutch C at times of backward and forward drive switching.

The current control device 100 essentially comprises a microcomputer 101. A command unit 105 is connected to this microcomputer 101, which unit transmits a command signal for engaging the clutch C. The command unit 105 may, for example, comprise a sensor for detecting movement of a shift lever not shown. Further, a load detector 106, which is itself known, is connected to the microcomputer 101. This load detector 106 detects loads acting on a transmission. Reference 102 indicates a control table comprising an internal ROM of the microcomputer 101 or an external memory. The control table 102 stores optimal control values related to the loads on the transmission for controlling the electromagnetic proportional reduction valve V. In response to the signals received from the command unit 105 and load detector 106, the microcomputer 101 refers to the control table 102 and supplies a control current I to the reduction valve V through an interface 103.

As shown in FIG. 2, a hydraulic system includes the electromagnetic proportional reduction valve V and a backward and forward drive switching valve 21 mounted on an oil line 20 extending from an oil pump 19 to the clutch C. When operating the backward and forward drive switching valve 21, the current control device 100 supplies, in response to the signal from the command unit 105, the control current I shown in FIG. 3a, for example. This control current I is made up of the following component currents I1–I3: a first component current I1 continuing at a first current level $i_1$ for a first predetermined time T1, a second component current I2 following the first component current and continuing at a second current level $i_2$ lower than the first current level $i_1$ for a second predetermined time T2, and a third component current I3 following the second component current, starting at a third current level $i_3$ lower than the second current level $i_2$ and continuing at the current level which rises with progress of time.

Figure 3A:
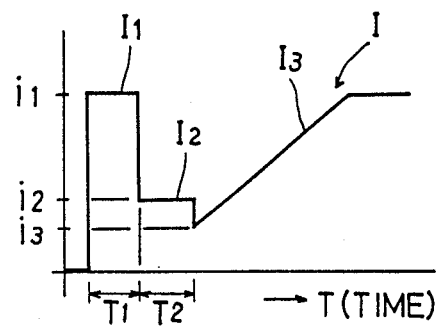
FIG. 3a is a graph showing variations of a current applied to an electromagnetic proportional reduction valve.
Figure 3B:
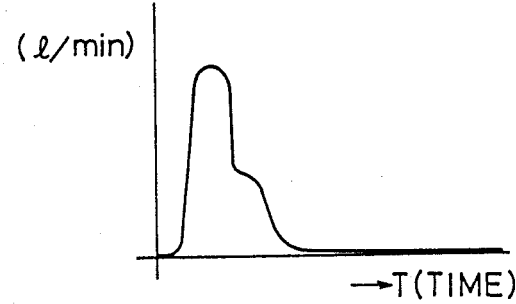
FIG. 3b is a graph showing variations in the amount of oil supplied to the hydraulic clutch.
Figure 3C:
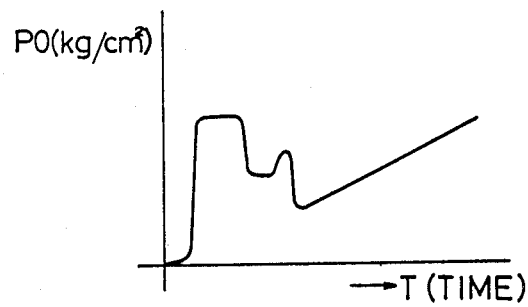
FIG. 3c is a graph showing variations in the internal pressure of the clutch adjacent the valve.
Figure 3D:
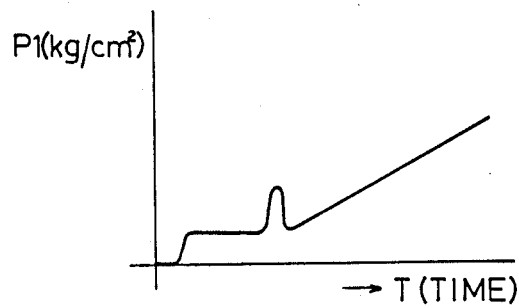
FIG. 3d is a graph showing variations in the internal pressure of the clutch.

The first current level $i_1$ desirable is a level for fully opening the reduction valve V. The second current level $i_2$ desirably is a level for producing a pressure in the order of 0.5–1 kg/cm$^2$ which is slightly greater than the force of springs 18B in the clutch C for neutralizing the pistons 12 and 13. The third component current I3 may describe a predetermined level gradient. FIG. 3b shows variations in the amount of oil supplied to the reduction valve V, FIG. 3c shows variations in the internal pressure of the clutch C adjacent the reduction value, and FIG. 3d shows variations in the clutching pressure, all occurring when the control current I shown in FIG. 3a is applied to the reduction valve V.

Figure 4:
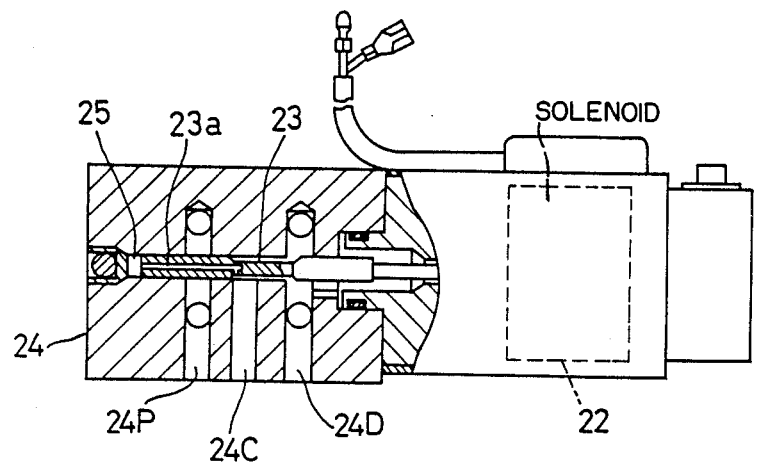
FIG. 4 is a view, partly in section, of the reduction valve.

Referring to FIG. 4, the reduction valve V includes a spool 23 operable by a solenoid 22, a casing 24 housing the spool 23, and a pressure chamber 25 communicating with a passage 23a defined in the spool 23. The casing 24 defines an input port 24P, an output port 24C and a drain port 24D. When the solenoid 22 is energized, the spool 23 is pushed out to a position at which the force pushing out the spool 23 balances with the pressure in the pressure chamber 25 placed in communication with the input port 24P through the passage 23a. As a result, the pressure is set for the output port 24C and the pressure oil is delivered under this set pressure to the clutch C. Pressure control is thus provided which is proportional to the current with which the solenoid 22 is energized.

In order to simplify the foregoing current control device 100, the control current I may comprise one type, that is the clutch control process may be uniformalized regardless of the loads acting on the transmission, with discrete circuits employed instead of the microcomputer to act as the principal control unit.

The present invention is applicable not only to tractors as in the described embodiment but to various other vehicles as well.

What is claimed is:

1. A hydraulic control apparatus for a transmission comprising;
   a hydraulic change speed clutch including force neutralizing springs (18B),
   a hydraulic pressure source,
   an oil line for connecting said change speed clutch to said hydraulic pressure source,
   an electromagnetic proportional reduction valve-mounted on said oil line for varying oil pressure output to said change speed clutch in response to a control current (I) applied to said reduction valve,
   control means for producing said control current and applying the same to said reduction valve, and
   command means for transmitting a command signal to said control means to engage said change speed clutch, wherein said control means produces said control current (I) including a first component current (I1) which continues at a first current level ($i_1$) for a first predetermined period (T1), a second component current (I2) following said first component current which continues at a second current level ($i_2$) which is lower than said first current level for a second predetermined period (T2) which is sufficient to produce a pressure slightly greater than the force of the springs, and a third component current (I3) following said second component current which starts at a third current level ($i_3$) not exceeding said second current level and continuing at a current level which rises with progress of time.

2. A hydraulic control apparatus as claimed in claim 1, wherein said third component current starts at a third current level which is lower than said second current level, and continues at a current level which rises with progress of time.

3. A hydraulic control apparatus as claimed in claim 2 further comprising a torque sensor means, load detecting means for detecting loads acting on said transmission by said torque sensor means and transmitting load values to said control means, wherein said control means comprises a microcomputer including a memory table for storing said first, second and third current levels, said first and second predetermined periods and a level rising rate of said third component current which are established in response to load values of the transmission and selected in accordance with load values transmitted from said load detecting means.

4. A hydraulic control apparatus as claimed in claim 2, further comprising a torque sensor means, a load detecting means for detecting loads acting on said transmission by said torque sensor means and transmitting load values to said control means, wherein said control means comprises a microcomputer including a memory table for storing said first, second and third current levels, said first and second predetermined periods and a level rising rate of said third component current, which are established in response to said load values of the transmission and selected in accordance with said load values transmitted from said load detecting means.

5. A hydraulic control apparatus for a transmission comprising:
a hydraulic change speed clutch including force neutralizing springs (18B),
a hydraulic pressure source,
an oil line for connecting said change speed clutch to said hydraulic pressure source,
an electromagnetic proportional reduction valve mounted on said oil line for varying oil pressure output to said change speed clutch in response to control current applied to said reduction valve,
control means for producing said control current (I) and applying the same to said reduction valve, and
command means for transmitting a command signal to said control means to engage said change speed clutch,
wherein said control means produces said control current (I) including a first component current (I1) which continues at a first current level ($i_1$) for a first predetermined period (T1), a second component current (I2) following said first component current which continues at a second current level ($i_2$) which is lower than said first current level for a second predetermined period (T2) which is sufficient to produce a pressure slightly greater than the force of the springs, a third period (T1), and a third component current (I3) following said second component current which starts at a third current level ($i_3$) which is lower than said second current level and continues at a current level which rises with progress of time.

* * * * *